(12) United States Patent
Ma et al.

(10) Patent No.: US 8,532,082 B2
(45) Date of Patent: *Sep. 10, 2013

(54) SYSTEM AND METHOD FOR FREQUENCY DIVISION MULTIPLE ACCESS COMMUNICATIONS

(75) Inventors: Jianglei Ma, Kanata (CA); Ming Jia, Ottawa (CA); Wen Tong, Ottawa (CA); Peiying Zhu, Kanata (CA); Hua Xu, Nepean (CA); Moussa Abdi, Paris (FR); Evelyne Lestrat, Paris (FR); Sarah Boumendil, Boulogne Billancourt (FR)

(73) Assignee: Research In Motion Limited, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/442,038

(22) Filed: Apr. 9, 2012

(65) Prior Publication Data

US 2012/0188946 A1    Jul. 26, 2012

Related U.S. Application Data

(63) Continuation of application No. 11/996,463, filed as application No. PCT/CA2006/001241 on Jul. 27, 2006, now Pat. No. 8,169,994.

(60) Provisional application No. 60/703,024, filed on Jul. 27, 2005.

(51) Int. Cl.
*H04B 7/208* (2006.01)

(52) U.S. Cl.
USPC .......................................................... 370/344

(58) Field of Classification Search
USPC .......................................................... 370/344
See application file for complete search history.

(56) References Cited

U.S. PATENT DOCUMENTS

| | | | |
|---|---|---|---|
| 6,947,748 | B2 | 9/2005 | Li et al. |
| 2005/0068931 | A1 | 3/2005 | Cho et al. |
| 2005/0094550 | A1 | 5/2005 | Huh et al. |
| 2006/0146952 | A1 | 7/2006 | Magee |
| 2006/0211441 | A1 | 9/2006 | Mese et al. |

FOREIGN PATENT DOCUMENTS

WO    2004038988 A2    5/2004

OTHER PUBLICATIONS

Tong et al., "Pilot-Assisted Wireless Transmissions", IEEE Signal Processing Magazine, Nov. 2004, vol. 21, No. 6, pp. 12-25.
Goto et al., "Investigations on Packet Error Rate of Variable Spreading and Chip Repetition Factors (VSCRF)-CDMA Wireless Access in Reverse Link Multi-cell Environment" 60th IEEE Vehicular Technology Conference (VTC2004-Fall), Sep. 26-29, 2004, vol. 2, pp. 944-948.
Lee, "Technology Overview", IEEE 802.20 Working Group on Mobile Broadband Wireless Access, Oct. 28, 2005, pp. 3, 9-13, 24-25.

(Continued)

*Primary Examiner* — Kenny Lin

(57) ABSTRACT

A method and system for wireless frequency division multiple access communications in the uplink and/or downlink directions. A first time duration for transmission of a data payload block is established, and the transmission is processed using a first frequency domain or a time domain. A second time duration for transmission of at least one pilot block is established, and the transmission is processed using a second frequency domain or the time domain, the second time duration is not greater than the first time duration.

20 Claims, 16 Drawing Sheets

(56) References Cited

OTHER PUBLICATIONS

3GPP, "Investigation on Pilot Channel Structure for Single-Carrier FDMA", 3GPP TSG RAN WG1 #42 on LTE, R1-05073, London, UK, Aug. 29-Sep. 2, 2005 (Retrieved from the Internet ,URL: http://www.quintillion.co.jp/3GPP/TSG_RAN/TSG_RAN2005/TSG_RAN_WG1_RL1_8.html>) whole document.

Kwak, "Future Converged Radio Access System (3GPP Perspective)", Samsung Electronics Co., Ltd., Jun. 27, 2006. (Retrieved from the Internet <URL: www.krnet.or.kr/board/include/download.asp?no=33&db=program&fileno=2>); pp. 8, 11 and 17-20.

International Search Report and Written Opinion dated Nov. 1, 2006 for International Application Serial No. PCT/CA2006/001241, International Filing Date: Jul. 27, 2006 consisting of 16-pages.

SYSTEM AND METHOD FOR FREQUENCY DIVISION MULTIPLE ACCESS COMMUNICATIONS

CROSS-REFERENCE TO RELATED APPLICATIONS

This application is a Continuation of a Submission Under 35 U.S.C. §371 Ser. No. 11/996,463, U.S. Pat. No. 8,169,994, filed Jan. 22, 2008, entitled SYSTEM AND METHOD FOR FREQUENCY DIVISION MULTIPLE ACCESS for U.S. National Stage Patent Application of International Application Number: PCT/CA2006/001241, filed 27 Jul. 2006, entitled SYSTEM AND METHOD FOR FREQUENCY DIVISION MULTIPLE ACCESS COMMUNICATIONS, which is related to and claims priority to U.S. Provisional Patent Application Ser. No. 60/703,024, filed 27 Jul. 2005, the entirety of all of which are incorporated herein by reference.

BACKGROUND

1. Statement of the Technical Field

The present invention relates to the field of wireless communications. More specifically the present invention relates to pilot designs for frequency division multiple access ("FDMA") wireless communications.

2. Description of the Related Art

There are a number of technologies currently used for wireless cellular communications. One of these is single carrier FDMA ("SC-FDMA") in which the carrier supported by a base station is divided so that uplink (mobile station to base station) and downlink (base station to mobile station) communication with mobile stations (also referred to herein as user elements ("UE")) is based on an assigned sub-band within the lager carrier, i.e., an assigned frequency slot and bandwidth.

The basic uplink transmission scheme for SC-FDMA is based on low-peak to average power ratio ("PAPR") transmission that uses a cyclic prefix to achieve uplink inter-user orthogonality and to enable efficient frequency-domain equalization at the receiver side In general, there are two types of frequency division multiple access multiplexing schemes for single carrier access. One is localized FDMA where each UE occupies a different sub-band, i.e., transmissions where discrete fourier transform outputs are mapped to consecutive but discrete sub-carriers. Another is interleaved FDMA ("IFDMA") where the discrete fourier transform output from each UE uses a comb-shaped frequency spectrum.

Dedicated pilots are needed for each UE to facilitate uplink ("UL") transmissions. Pilot channels are "overhead" channels used to facilitate synchronization and system timing between the mobile station and the base station. Pilot channels are typically arranged to repeat a simple signal at high power level (with respect to the other channels) so that the mobile devices can locate the base station. The pilot design is, however, more challenging for single carrier based UL communications than for orthogonal FDMA ("OFDMA") based UL access where scattered distributed pilots can be embedded into the data burst.

Given the specific requirements of FDMA and IFDMA, prior art pilot insertion schemes are not as effective when used in these arrangements. For example, the use of an UL scattered distributed pilot scheme, where pilots are embedded in each UL cluster, increases the PAPR. Known time division multiplexed ("TDM") based schemes, while having a lower PAPR than scattered schemes, result in excessive overhead when supporting high speed mobile devices. Furthermore, it is difficult to obtain optimal pilot densities, in time and frequency, for TDM based pilots because there is overly dense pilots in frequency vs. overly sparse pilots in time. An example of a prior art arrangement is shown in FIG. 1 in which the pilot 4 is positioned at the beginning of transmission time duration, also referred to herein as the transmission time interval ("TTI"), and occupies an entire payload block 6. Data payload blocks 7 are shown as unfilled payload blocks 6.

A need exists, therefore, for an improved pilot design for FDMA communications.

SUMMARY

The present invention includes systems and methods for SC-FDMA communications, for example, UL communications, where a pilot block having a duration that is not greater than the duration of a data payload block is used.

In accordance with one aspect a method for wireless frequency division multiple access communications in the uplink and/or downlink direction is provided in which a first time duration for transmission of a data payload block is established, and the transmission is processed using a first frequency domain or a time domain. A second time duration for transmission of at least one pilot block is established, and the transmission is processed using a second frequency domain or the time domain, the second time duration is not greater than the first time duration.

In accordance with another aspect a system for wireless frequency division multiple access communications is provided in which a controller is operable to establish a first time duration for transmission of a data payload block, and the transmission is processed using a first frequency domain or a time domain. The controller is also operable to establish a second time duration for transmission of at least one pilot block, and the transmission is processed using a second frequency domain or the time domain, the second time duration is not greater than the first time duration.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION

Figure 1:
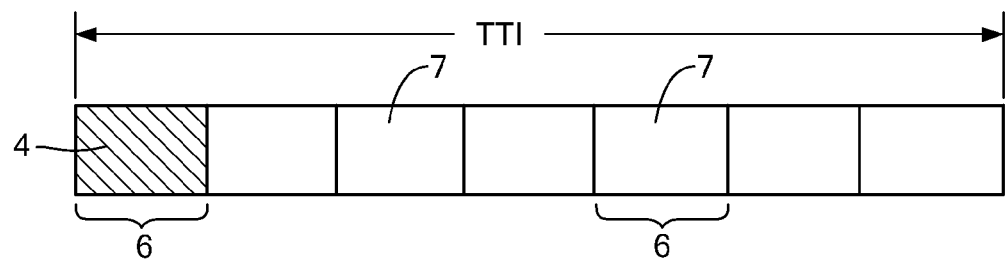
FIG. 1 is a diagram of a prior art time domain structure.
Figure 2:
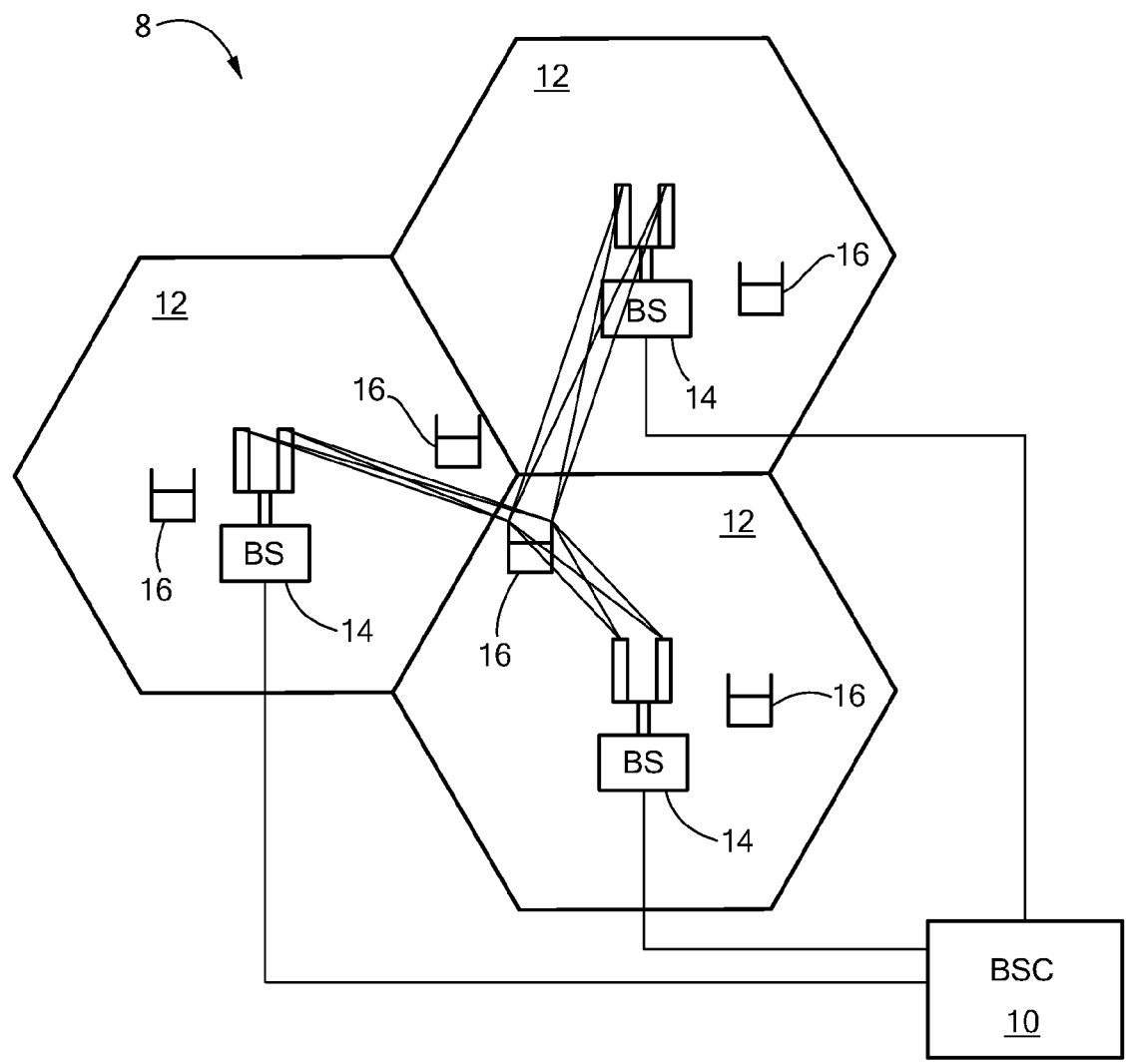
FIG. 2 is a diagram of a system constructed in accordance with the principles of the present invention.

Referring now to the drawing figures in which like reference designators refer to like elements, there is shown in FIG. 2 a system constructed in accordance with the principles of the present invention and designated generally as "8". System 8 includes a base station controller (BSC) 10 that controls wireless communications within multiple cells 12, which are served by corresponding base stations (BS) 14. In general, each base station 14 facilitates communications with UEs 16, which are within the cell 12 associated with the corresponding base station 14. As illustrated, the base stations 14 and UEs 16 may include multiple antennas to provide spatial diversity for communications in a multiple input multiple output ("MIMO") antenna arrangement.

Figure 3:
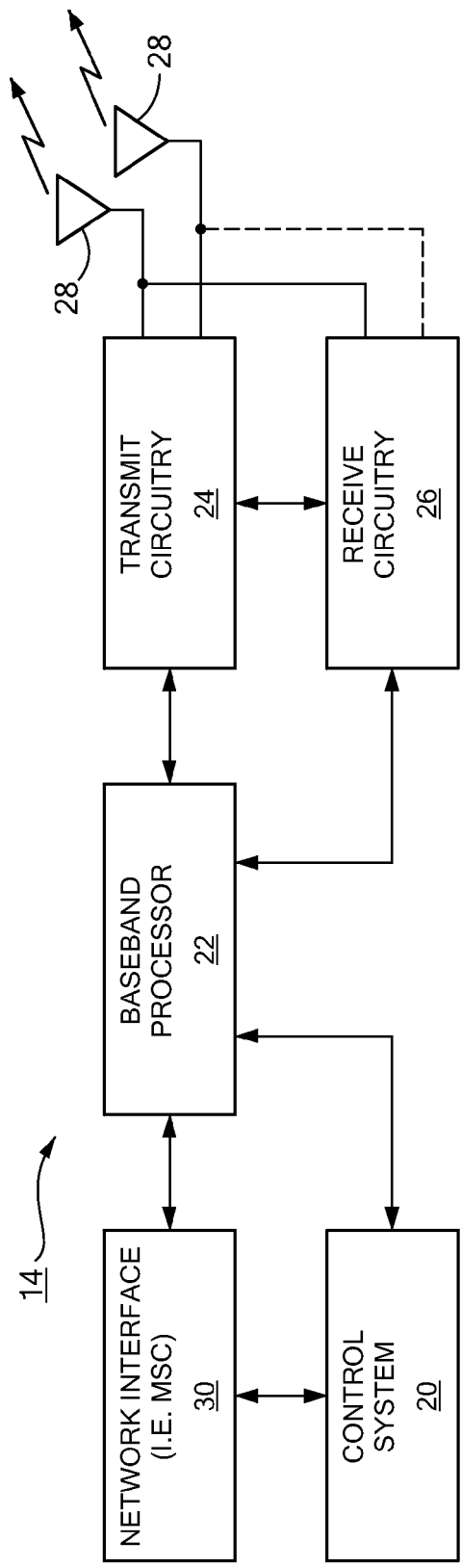
FIG. 3 is a block diagram of a base station constructed in accordance with the principles of the present invention.

A high level overview of the UEs 16 and base stations 14 of the present invention is provided prior to delving into the structural and functional details of the preferred embodiments. With reference to FIG. 3, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by UEs 16 (illustrated in FIG. 4). Preferably, a low noise amplifier and a filter (not shown) cooperate to amplify and remove broadband interference from the signal for processing. Downconversion and digitization circuitry (not shown) then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another UE 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) amplifies the modulated carrier signal to a level appropriate for transmission, and delivers the modulated carrier signal to the antennas 28 through a matching network (not shown). Modulation and processing details of the present invention are described in greater detail below.

Figure 4:
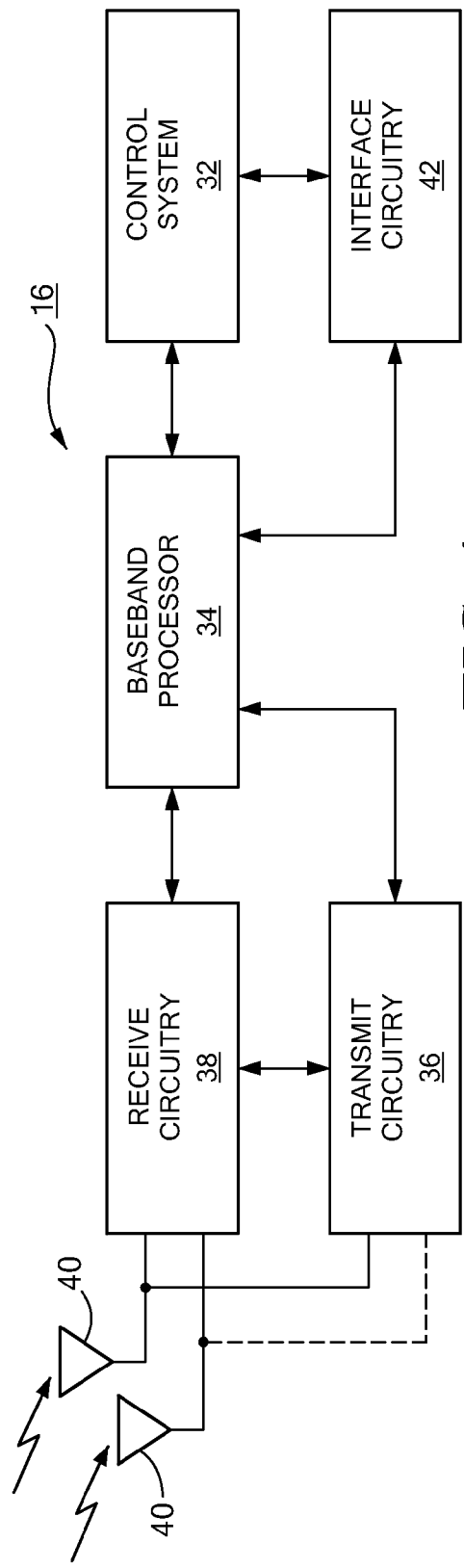
FIG. 4 is a block diagram of a user element constructed in accordance with the principles of the present invention.

With reference to FIG. 4, a block diagram of a UE 16 configured according to the principles of the present invention is described. Of note, UE 16 need not be moving or capable of moving in accordance with the present invention. In other words, a fixed wireless user device such as a desktop computer equipped with the hardware described herein and capable of functioning as described herein can serve as a UE 16 just as can a mobile station such as a telephone, handheld computer, laptop computer, PDA, etc. Similar to the base station 14, the UE 16 can include a control system 32, a baseband processor 34, transmit circuitry 36, receive circuitry 38, multiple antennas 40, and user interface circuitry 42. The receive circuitry 38 receives radio frequency signals bearing information from one or more base stations 14. Preferably, a low noise amplifier and a filter (not shown) cooperate to amplify and remove broadband interference from the signal for processing. Downconversion and digitization circuitry (not shown) downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed on greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are applicable to the present invention.

In an embodiment, FFT/DFT pre-processing or spreading is used together with IFFT/IDFT to simplify the implementation. Each base station 14 is equipped with n transmit antennas 28, and each UE 16 is equipped with m receive antennas 40. Notably, the respective antennas can be used for reception and transmission using appropriate duplexers or switches and are so labeled only for clarity.

Although not shown, base stations 14 and UEs 16 include a central processing that serves as a controller operable to control the above-described components and cause the functions of the present invention described herein to be performed.

Figure 5:
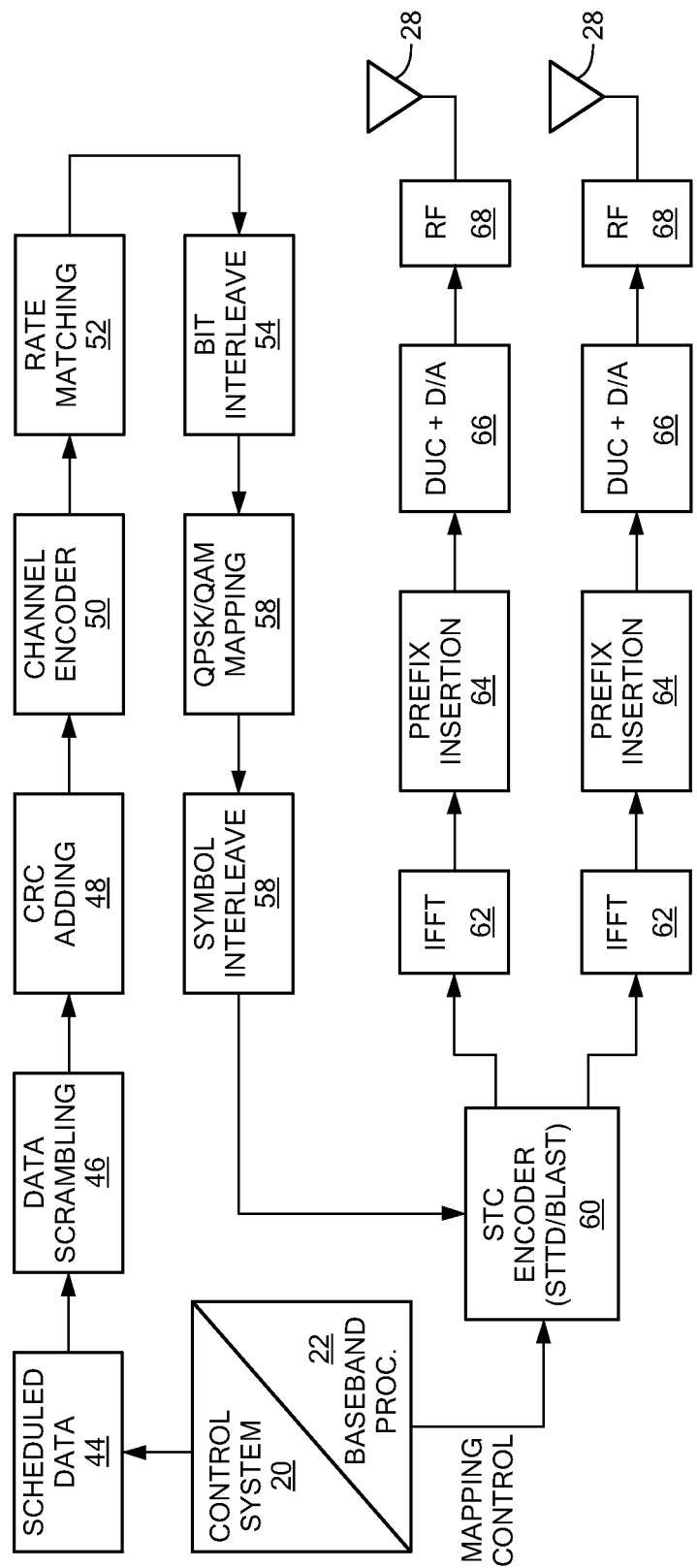
FIG. 5 is a diagram of an exemplary logical FDMA transmission architecture constructed in accordance with the principles of the present invention.

With reference to FIG. 5, an exemplary logical FDMA transmission architecture constructed in accordance with the principles of the present invention is described. The scheduled data 44, which is a stream of bits, is scrambled using data scrambling logic 46. A cyclic redundancy check ("CRC") for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the channel quality indicator ("CQI") measurement. The channel encoder logic 50 uses known turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation ("QAM") or Quadrature Phase Shift Key ("QPSK") modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code ("STC") encoder logic 60, which modifies the symbols in a fashion that makes the transmitted signals more resistant to interference and more readily decoded at a mobile terminal 16.

Figure 6:
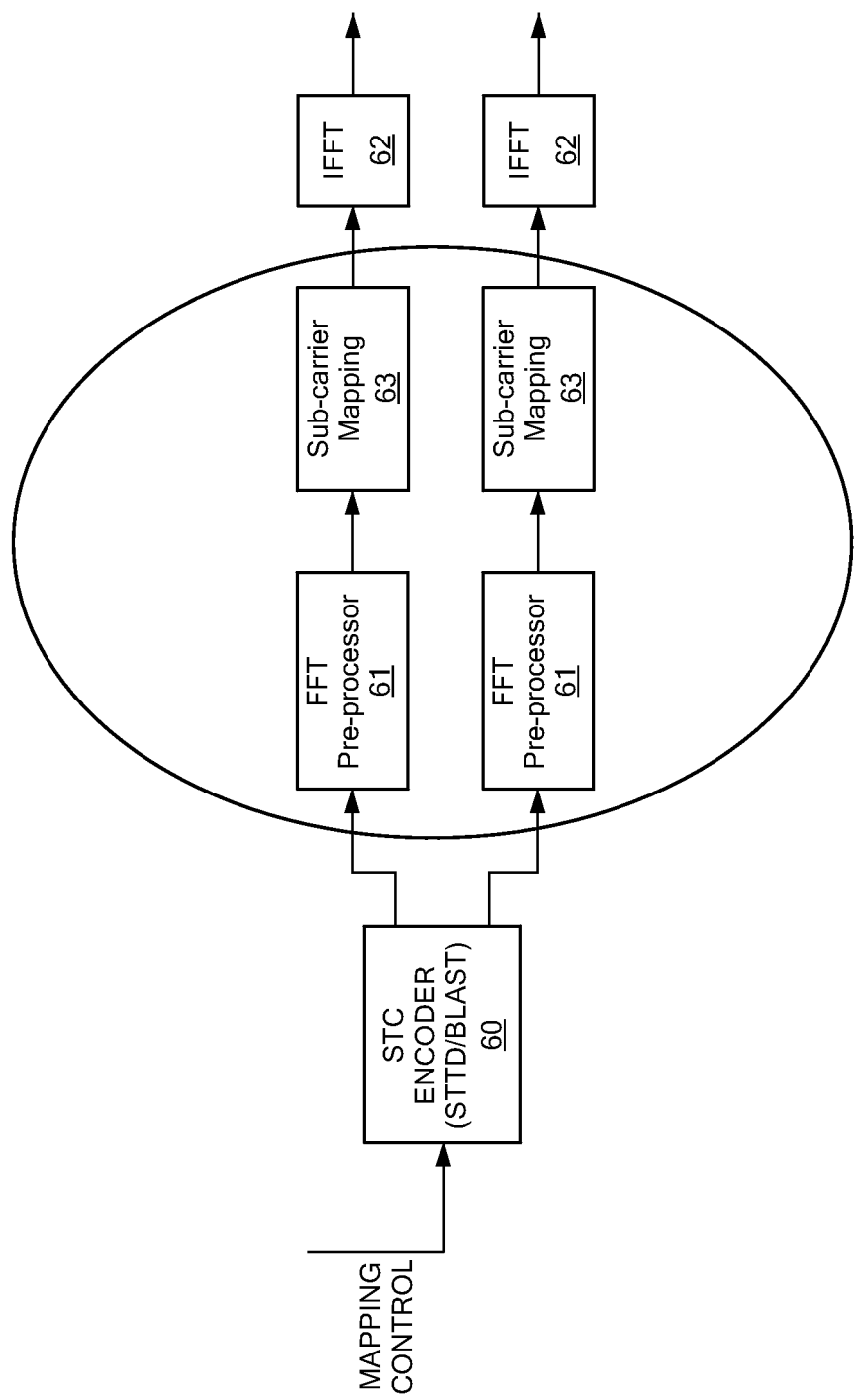
FIG. 6 is a diagram of an FFT pre-processor and mapping block for use in the exemplary logical FDMA transmission architecture of FIG. 5.

Accordingly, as is shown in FIG. 6, each of the symbol streams output by the STC encoder logic 60 is sent to a corresponding FFT pre-processing processor 61 and then to IFFT processor 62 through sub-carrier mapping logic 63. It is also noted that, although pre-processor 61 is shown as FFT pre-processing processor, that element can be a discrete fourier transform ("DFT") pre-preprocessor. Those skilled in the art will recognize that one or more processors may be used to provide such digital signal processing, alone or in combination with other processing described herein. Referring again to FIG. 5, the output of IFFT processors 62 are grouped into frames, which are associated with a prefix by like insertion logic 64. Each of the resultant signals is up-converted in the digital domain to an intermediate frequency and converted to an analog signal via the corresponding digital up-conversion ("DUC") and digital-to-analog ("D/A") conversion circuitry 66. The resultant (analog) signals are then simultaneously modulated at the desired RF frequency, amplified, and transmitted via the RF circuitry 68 and antennas 28. Notably, pilot signals known by the intended UE 16 are scattered among the sub-carriers. As is discussed below, the UEs 16 use the pilot signals for channel estimation.

In accordance with an embodiment of the invention, a pilot arrangement for FDMA UL communications is described. Of note, although present invention is described with reference to UL communications, it is understood that the present invention can readily be implement with DL communications. UL communications are described herein for the sake of simplicity and ease of understanding the present invention.

According to one embodiment, the FDMA UL communications are designed to operate in conjunction with communication systems employing the Universal Mobile Telecommunications System ("UMTS") standard, which standard is hereby incorporated by reference (including the text proposal entitled: "Principles for the Evolved UTRA"). The broader inventions set out in the summary and claims are not, however, limited in this regard.

According to an embodiment of the invention a pilot arrangement for FDMA UL communications may be provided by using different fast fourier transform ("FFT") sizes for pilot symbols ("FFT_pilot") and payload ("FFT_payload") symbols in which the pilot symbol uses the smaller IFFT. For example, an arrangement can be defines as: FFT_pilot=FFT_payload/($2^M$) where M=1, 2, 3, . . . ). This results in increased sub-carrier spacing and allows the FFT size of the pilot symbol to be determined by the channel type. The cyclic prefix size may also be adjusted accordingly to maintain TTI slot structure. Also, the spacing between TDM pilot symbols in each TTI may be adjusted according to the mobility speed of the UE 16. Of note, M can also equal 0 in which case FFT_pilot=FFT_payload and the duration of the pilot block and the payload blocks are equal. The subsequent transmission can be accomplished by processing in the time domain or frequency domain.

An optional pilot design may be obtained by choosing appropriate pilot symbol IFFT sizes and pilot symbol spacing. Of note, "M" may be different for the two different types of single carrier based transmission, namely IFDMA and localized FDMA. However, more pilot overhead may be required to support IFDMA.

Figure 7:
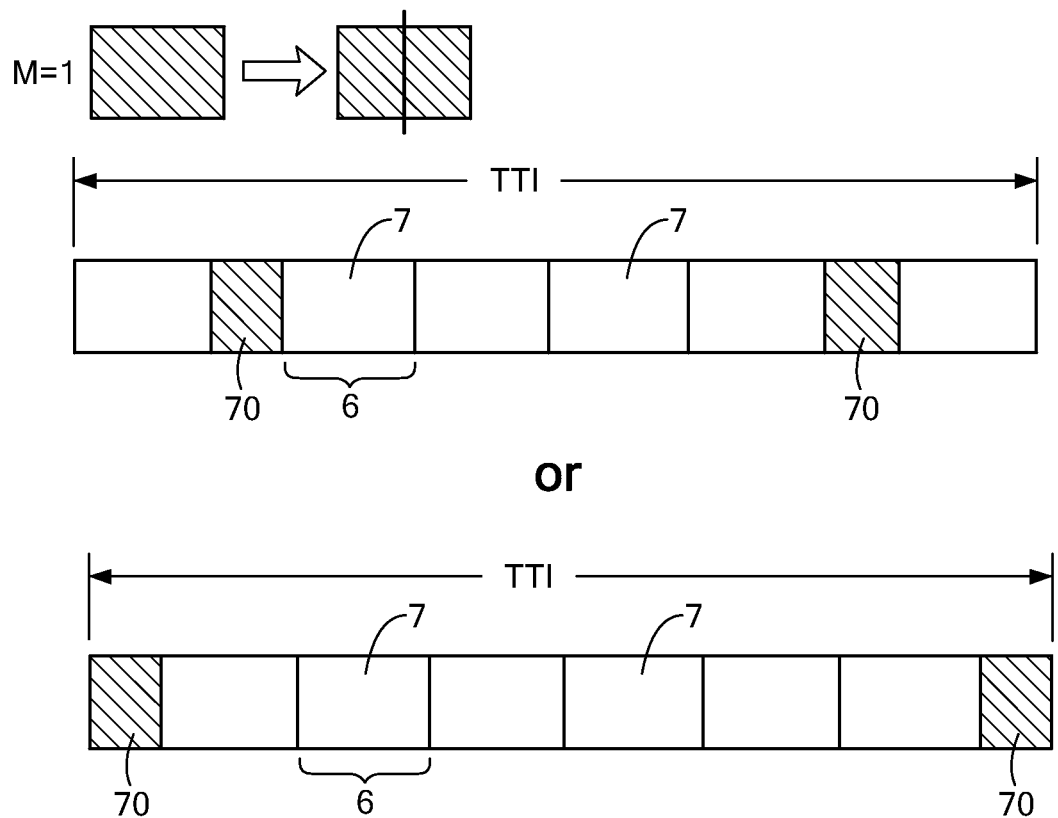
FIG. 7 is a diagram of a time domain structure constructed in accordance with the principles of the present invention.

An exemplary time domain structure constructed in accordance with the principles of the invention where M=1 is described with reference to FIG. 7. As is shown, when M=1, the TDM pilot is provided as two short pilot symbols in which the duration of each pilot block 70 is half of the duration of the data payload block 7. This arrangement advantageously allows better channel estimation to be made by base station 14 because, by providing pilot transmission at two places within a TTI, base station 14 has a basis for interpolation to make the estimation. This is particularly relevant when UEs 16 are moving and the channel quality can change even during a very short period of time as a UE 16 changes location. As is shown in FIG. 7, pilot block 70 can be provided at the beginning and end of a TTI or offset from the beginning and end of the TTI.

Figure 8:
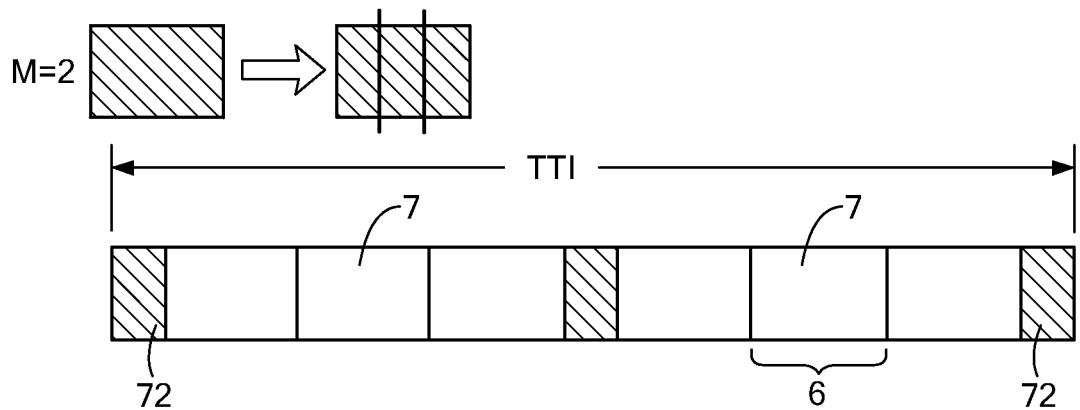
FIG. 8 is a diagram of another time domain structure in constructed in accordance with the principles of the present invention.

FIG. 8 provides another example of a time domain structure constructed in accordance with the principles of the present invention in which M=2. Here, short pilot block 72 is one third the duration of the data payload block 7. As such, three short pilot blocks 72 are provided within a TTI, thereby allowing the system to support even faster mobility speeds for UEs 16 as compared with the arrangement shown in FIG. 7 where M=1. This is the case because even more points for interpolation are provided by having a TTI that includes three short pilot blocks 72. Although the present invention includes examples in which M=1 and M=2, it is understood that the present invention is not limited to such.

Exemplary embodiments of the invention provide a pilot arrangement that may be based on, but not limited to, the following OFDM parameters:

0.5 ms TTI
Fs=7.68 MHz (2*3.84)
512 FFT for 5 MHz bandwidth
7 OFDM symbols per TTI
    40 CP samples for first symbol (5.2 us)
    36 CP samples for the rest of symbols (4.69 us)
Sub-carrier spacing: 15 KHz Exemplary embodiments of the invention provide a TDM based pilot design for localized FDMA that may be provided by partitioning the first OFDM symbol in each TTI into three short pilot OFDM symbol and evenly distributing three short symbols every TTI. For example, the following parameters can be used:

FFT size: 128 (M=2)
CP: 56 samples (7.29 us)
Pilot Spacing
    In frequency: 4 sub-carriers (sub-carrier spacing: 15 MHz)
    In time: 3 traffic symbols
    For slow speed UEs 16, the second short pilot symbol can be used to support CQI measurement for N active UEs 16, where N depends on the coherent channel bandwidth and each UE 16 is assigned 1/N equal spaced sub-carriers.

Figure 9:
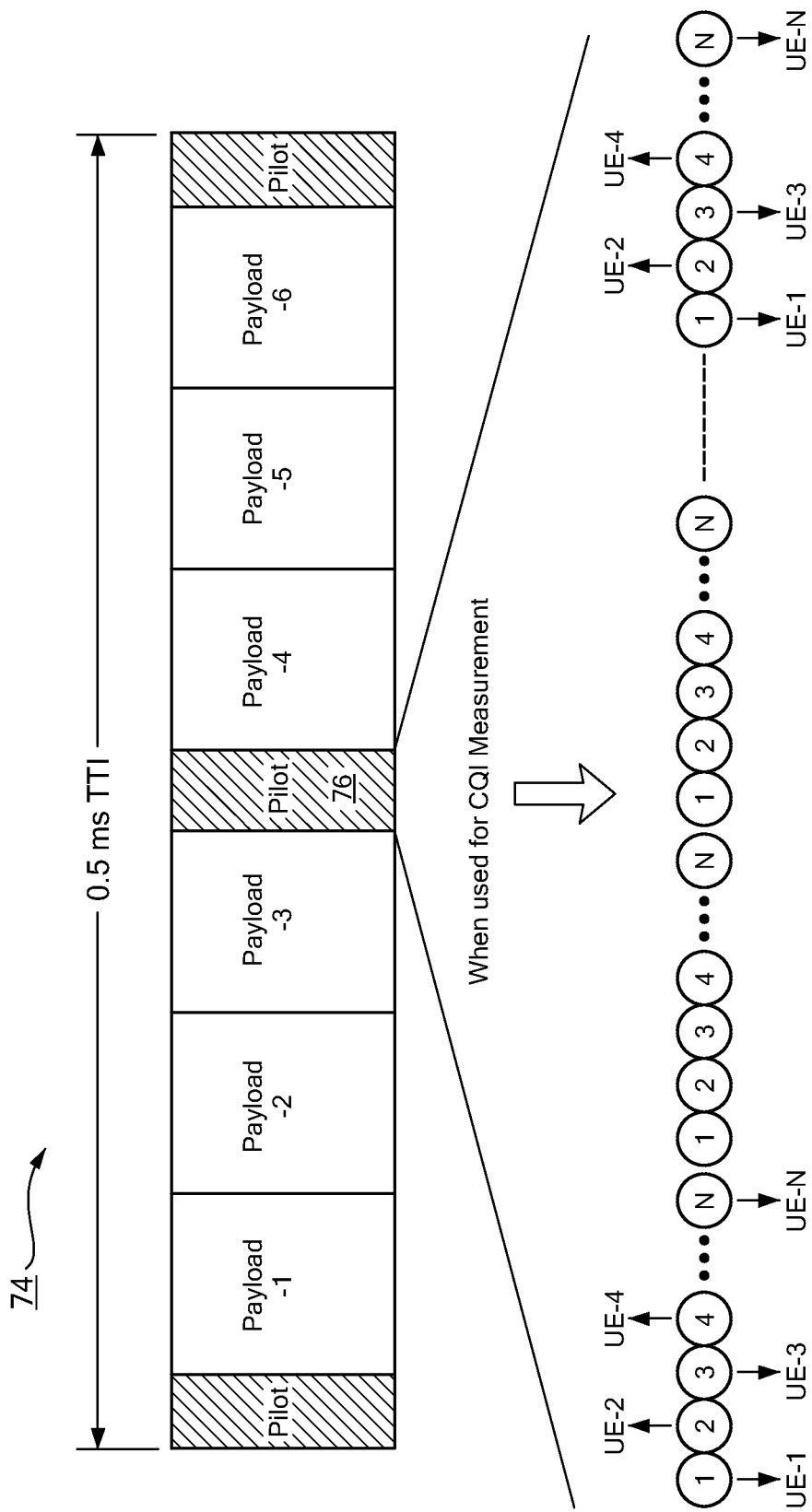
FIG. 9 is a diagram of the time domain structure of FIG. 8 showing an alternate use for one of the pilot time slots.

FIG. 9 provides a time domain arrangement 74 for localized FDMA in accordance with an aspect of the present invention where M=2. According to this arrangement, a pilot time slot may be used for reasons other than channel estimation. For example, a pilot time slot may be used for CQI measurement of all active users (as indicated by the media access control protocol). FIG. 9 shows a TTI of 0.5 ms, it being understood that other duration TTIs can be used. In the example shown in FIG. 9, the middle pilot time slot 76 is used for CQI measurement for N UEs 16. In such an arrangement, UEs 16 share pilot time slot 76. This allows the base station 14 to measure a CQI for multiple UEs 16. Of course, a separate pilot time slot need not be used for CQI measurement, and it is contemplated that a pilot time slot can be used for both CQI measurement and channel estimation in the same pilot duration.

Figure 10:
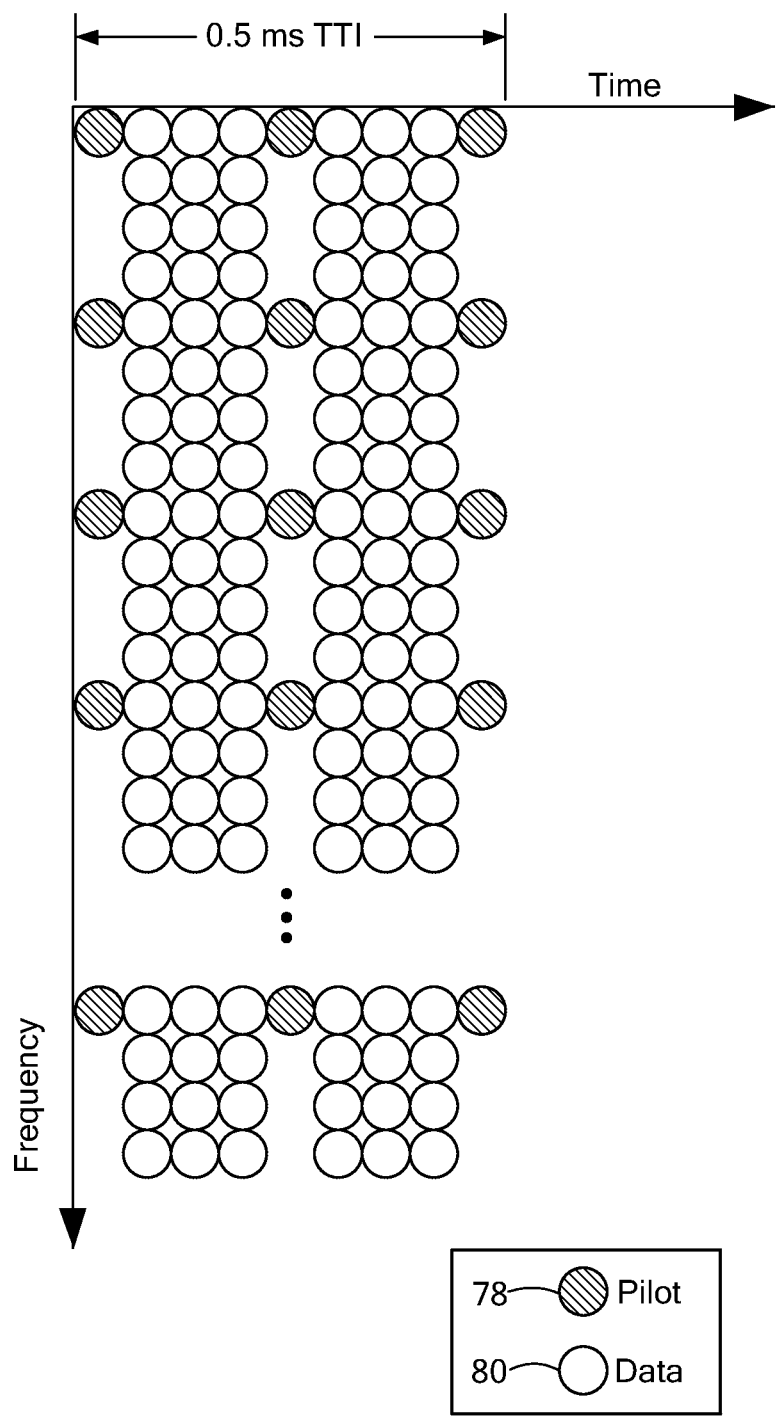
FIG. 10 is a diagram of an exemplary frequency domain arrangement for localized FDMA (non-MIMO) arranged in accordance with an embodiment of the invention.

FIG. 10 shows an exemplary frequency domain arrangement for localized FDMA (non-MIMO) in accordance with an embodiment of the invention where M=2. As is shown, the resultant different IFFTs for the short pilot symbols 78 and data symbols 80 provide an arrangement in which the pilot symbols 78 are provided with larger frequency domain spacing than the data symbols 80.

Figure 11:
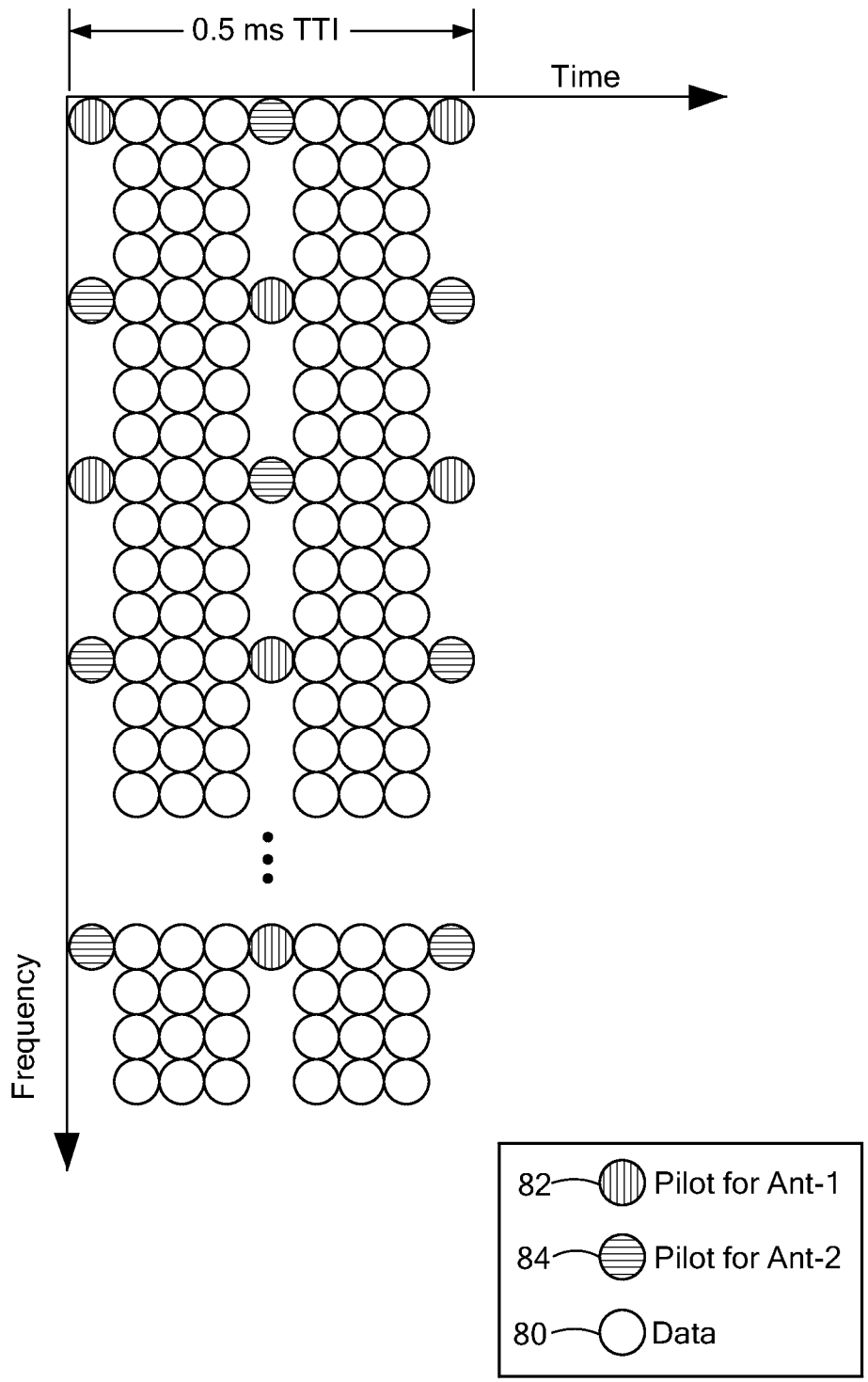
FIG. 11 is a diagram of a frequency domain arrangement for a MIMO-based localized FDMA arrangement constructed in accordance with an embodiment of the invention.

FIG. 11 is a diagram of a frequency domain arrangement for a MIMO-based localized FDMA arrangement constructed in accordance with an embodiment of the invention where M=2 and there are two antennas. As is shown, the resultant different IFFTs for the short pilot symbols 82 and 84 for antennas 1 and 2, respectively, and data symbols 80 provide an arrangement in which the pilot symbols 82 and 84 are allocated a larger frequency domain spacing than the data symbols 80. At a sub-carrier frequency that includes short pilot symbols, short pilot symbols 82 and 84 are alternated within the pilot symbol slot provided within a TTI.

Figure 12:
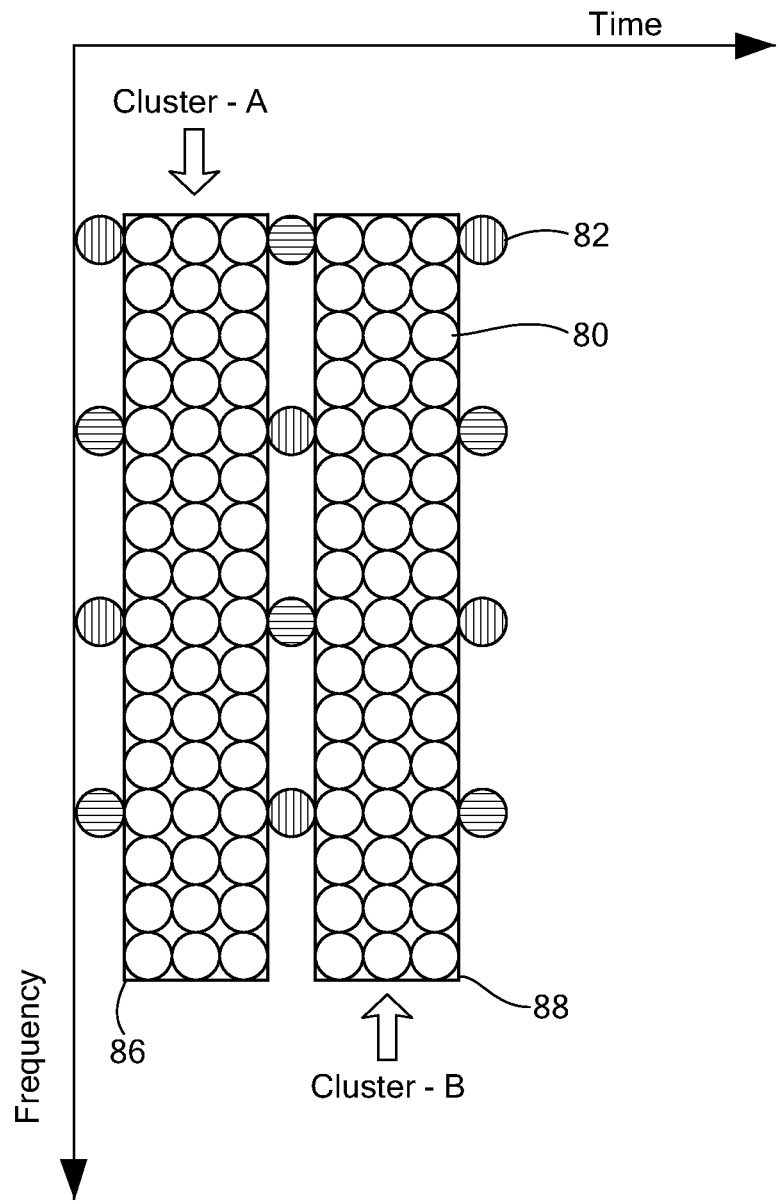
FIG. 12 is a diagram of an UL cluster arrangement for localized FDMA in accordance with an embodiment of the invention.

FIG. 12 is a diagram of an UL cluster arrangement for localized FDMA in accordance with an embodiment of the invention. For the purposes of the example of FIG. 12, a cluster is considered the minimum transmission unit per channel resource assignment for the UL communications. Two clusters are shown, namely cluster-A 86 and cluster-B 88 in which each cluster includes 3 traffic OFDM symbols. Each OFDM symbol is arranged such that it may include 4N (N=4 for example) consecutive sub-carriers in each OFDM symbol. In other words, when a UE 16 is allocated some channel resource to use for transmission, these resources are allocated at the cluster level. Of note, although FIG. 12 shows 3 traffic OFDM symbols per cluster, it is understood that a cluster can be arranged to include more or fewer than 3 traffic OFDM symbols.

Figure 13:
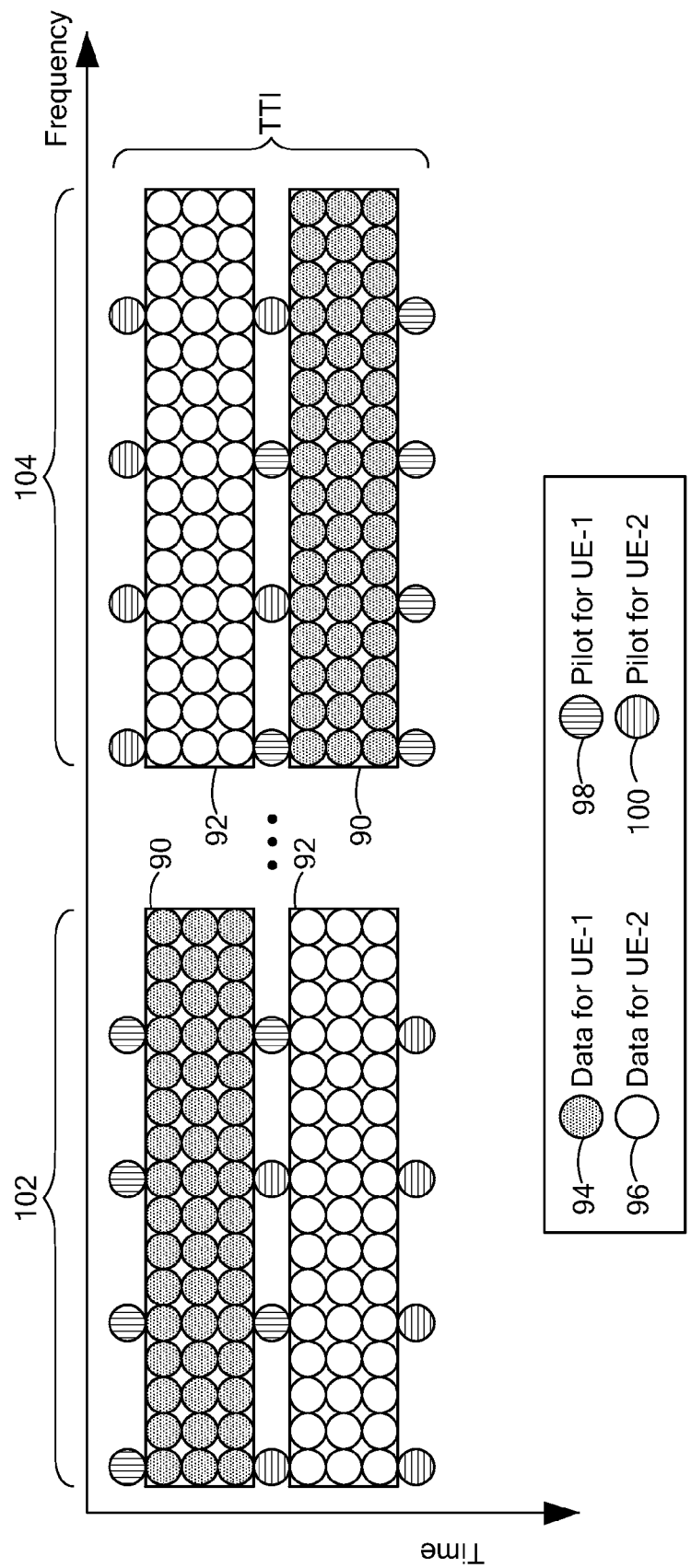
FIG. 13 is a diagram of an UL cluster arrangement for non-MIMO localized FDMA in accordance with an embodiment of the invention which supports frequency diversity through the use of cluster hopping.

FIG. 13 is a diagram of an UL cluster definition for non-MIMO localized FDMA in accordance with an embodiment of the invention which supports frequency diversity through the use of frequency hopping. FIG. 13 shows cluster 90 for a first UE 16 and cluster 92 for a second UE 16. Cluster 90 includes data sub-carriers 94, and cluster 92 includes data sub-carriers 96. Pilot 98 is allocated to the first UE 16 and pilot 100 is allocated to the second UE 16. As is shown in FIG. 13, two sub-bands 102 and 104 are provided. The sub-bands are used for frequency hopping so that cluster 90 is transmitted in the first of the two TTIs shown in sub band 102 and then hops to the second TTI in sub-band 104. The result is a two cluster hop in each TTI. It is also noted that, as shown in FIG. 13, the short pilot symbol between the TTIs is shared by two UEs 16.

Figure 14:
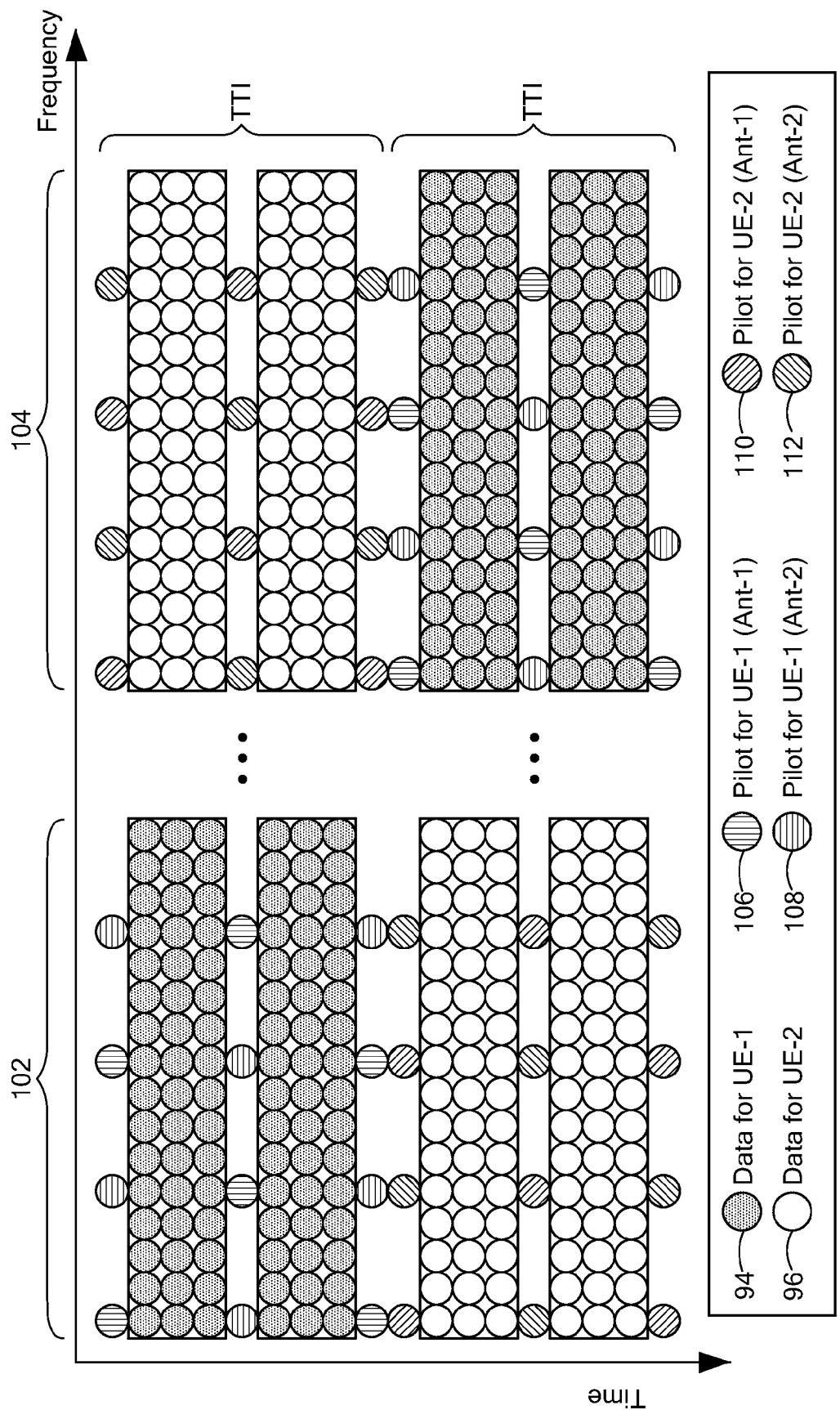
FIG. 14 is a diagram of an UL cluster definition for MIMO operation with localized FDMA as constructed in accordance with the principles of the present invention.

FIG. 14 is a diagram of an UL cluster definition for MIMO operation with localized FDMA as constructed in accordance with the principles of the present invention. As with the example of FIG. 13, frequency diversity may be obtained by cluster hopping in which one cluster hop is used in each TTI. As is shown in FIG. 14, multiple clusters and multiple sub bands can be assigned to support multiple UEs 16. Two consecutive clusters are assigned to each UE 16. To support MIMO operation, pilot 106 is assigned to the first antenna for the first UE 16 and pilot 108 is assigned to the second antenna for the first UE 16. Similarly, pilot 110 is assigned to the first antenna for the second UE 16 and pilot 112 is assigned to the second antenna for the second UE 16. Of course the quantity of consecutive clusters assigned to a UE 16 as well as the quantity of TTIs used to support cluster hopping need not be limited to the arrangement shown in FIG. 14.

As is noted above, the present invention also supports IFDMA operation. According to an embodiment of the invention a TDM based pilot design for sub-band IFDMA may be provided using wide-band IFDMA or sub-band IFDMA. For wide-band IFDMA operation, more frequency diversity is provided compared to localized FDMA. However, wide-band IFDMA suffers from the noise enhancement effect and requires more pilot overhead than localized FDMA. Sub-band IFDMA suffers a smaller impact from noise enhancement effect and also requires less pilot overhead than wide-band IFDMA. Sub-band IFDMA is useful for low rate transmission. To support sub-band IFDMA, the first OFDM symbol in each TTI can be partitioned into two short pilot OFDM symbols. For example, the FFT size can be set at 256 (M=1). Cyclic prefix ("CP") sizes of the short pilot symbol and traffic symbols may be determined jointly to obtain uniform protection. For example, a CP size of 32 samples (4.17 us) can be used. The IFDMA sub-carriers are equally spaced. Two short pilot symbols may be inserted in each TTI and sets of sub-bands may be assigned to more than one UE 16. It is noted that the sub-carriers in the pilot symbol may be shared by different UEs 16. The time domain arrangements in FIGS. 7 and 8 can be used to support sub-band IFDMA.

Figure 15:
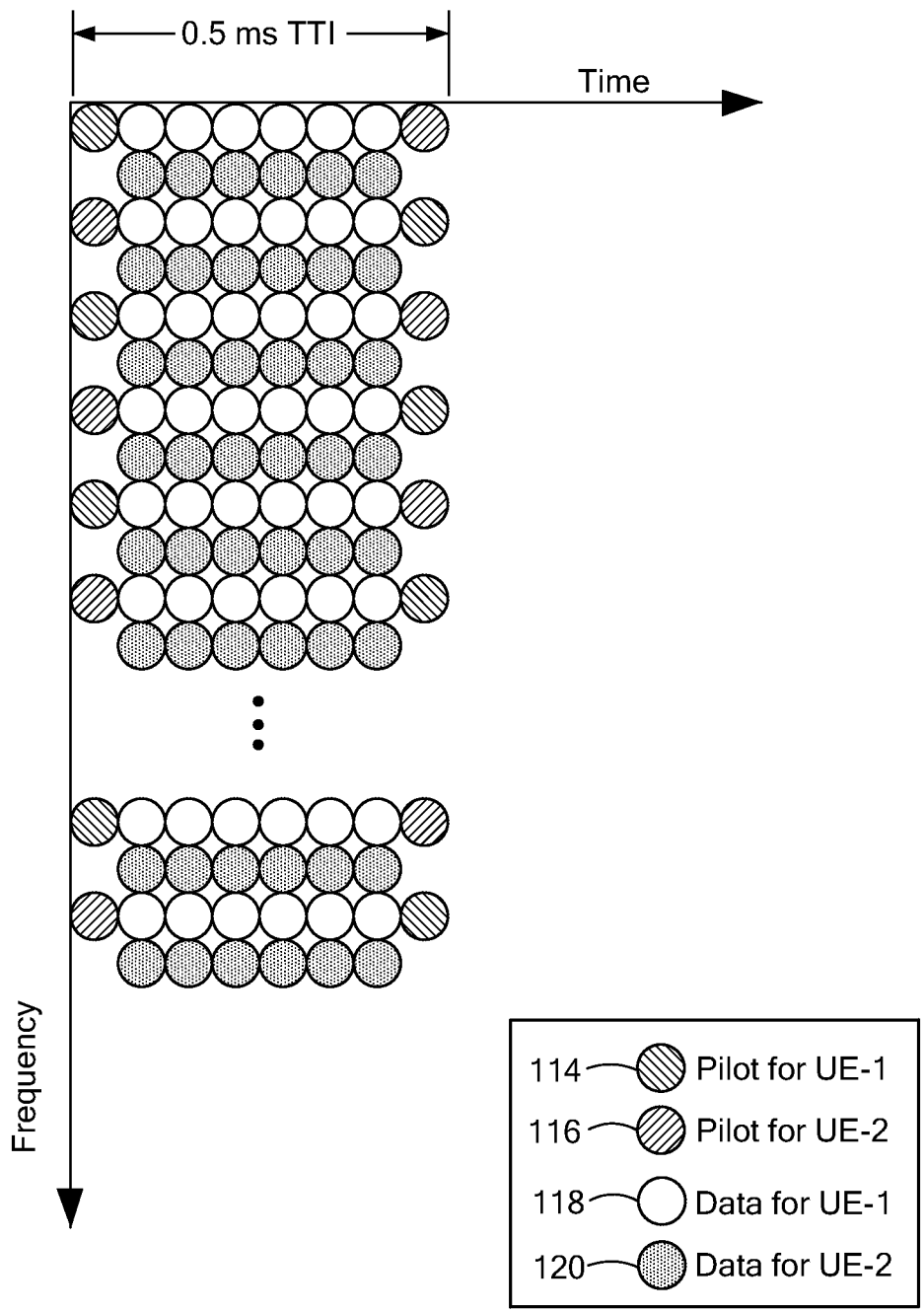
FIG. 15 is a diagram of a frequency domain arrangement for multiple user element non-MIMO sub-band IFDMA operation constructed in accordance with the present invention.

FIG. 15 is a diagram of a frequency domain arrangement for multiple UE 16 non-MIMO sub-band IFDMA operation in accordance with the present invention. Two UEs 16 are shown. As is shown, pilot 114 is assigned to the first UE 16 and pilot 116 is assigned to the second UE 16. Each of pilots 114 and 116 shown is one half of the FFT size used to support data sub-carriers 118 (for the first UE 16) and 120 (for the second UE 16). However, the same FFT size could be used, thereby eliminating the frequency spacing between pilot sub-carriers. In addition, as is shown, a pilot for a corresponding UE 16 does not have to use the same frequencies as the corresponding data sub-carriers. For example, as is shown in FIG. 15, pilot 116 for the second UE 16 is aligned in the frequency domain with data sub-carriers 118 for the first UE 16. It is also understood that the arrangement shown can support more than 2 UEs 16.

Figure 16:
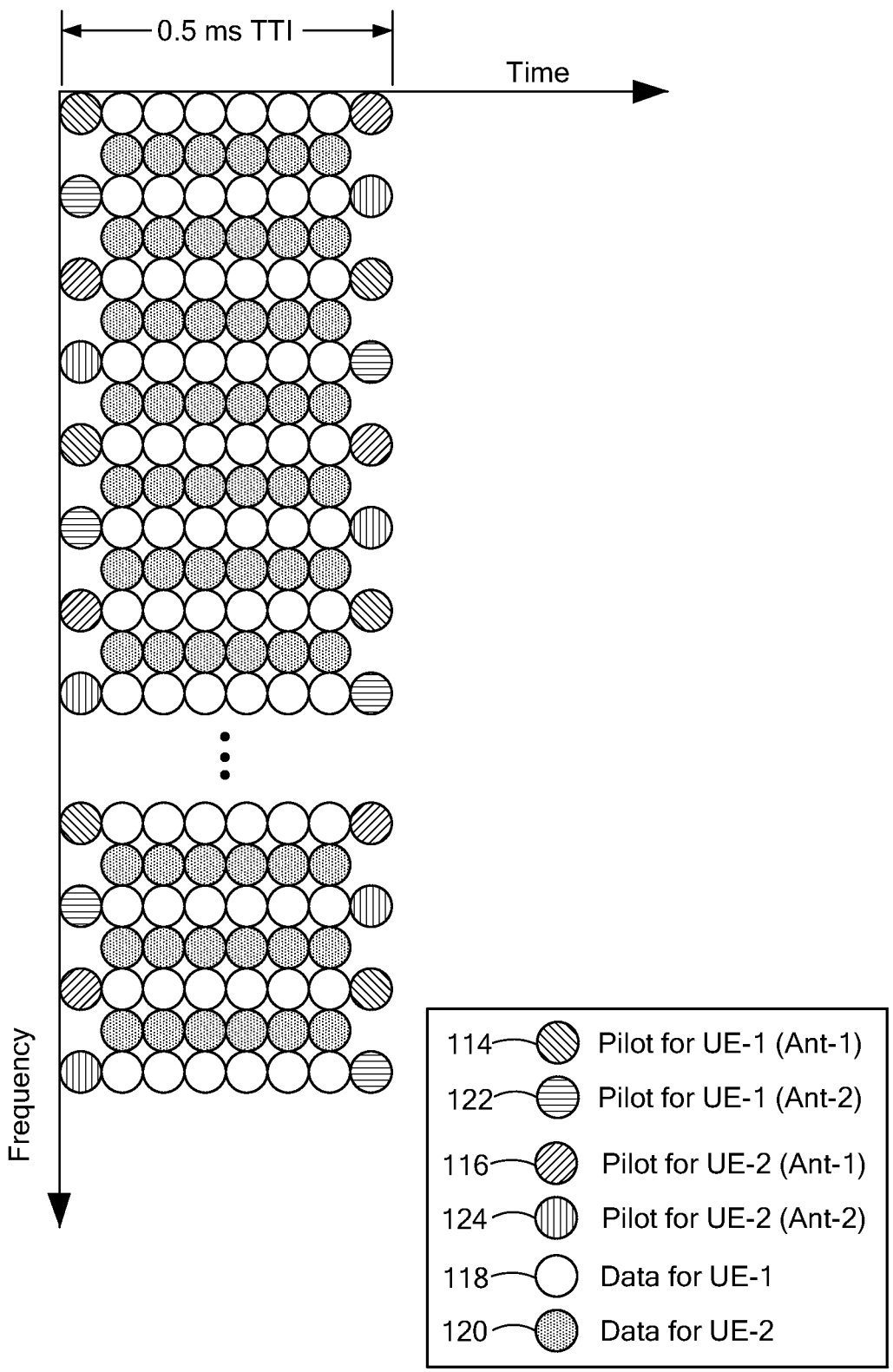
FIG. 16. is a diagram of a frequency domain arrangement for multiple user element MIMO sub-band IFDMA operation constructed in accordance with the present invention.

FIG. 16. is a diagram of a frequency domain arrangement for multiple UE 16 MIMO sub-band IFDMA operation constructed in accordance with the present invention. FIG. 16 is similar to FIG. 15 but shows pilot allocation supporting multiple antennas. In particular, FIG. 16 shows pilot 122 for supporting a second antenna for the first UE 16 and pilot 124 for supporting a second antenna for the second UE 16.

Figure 17:
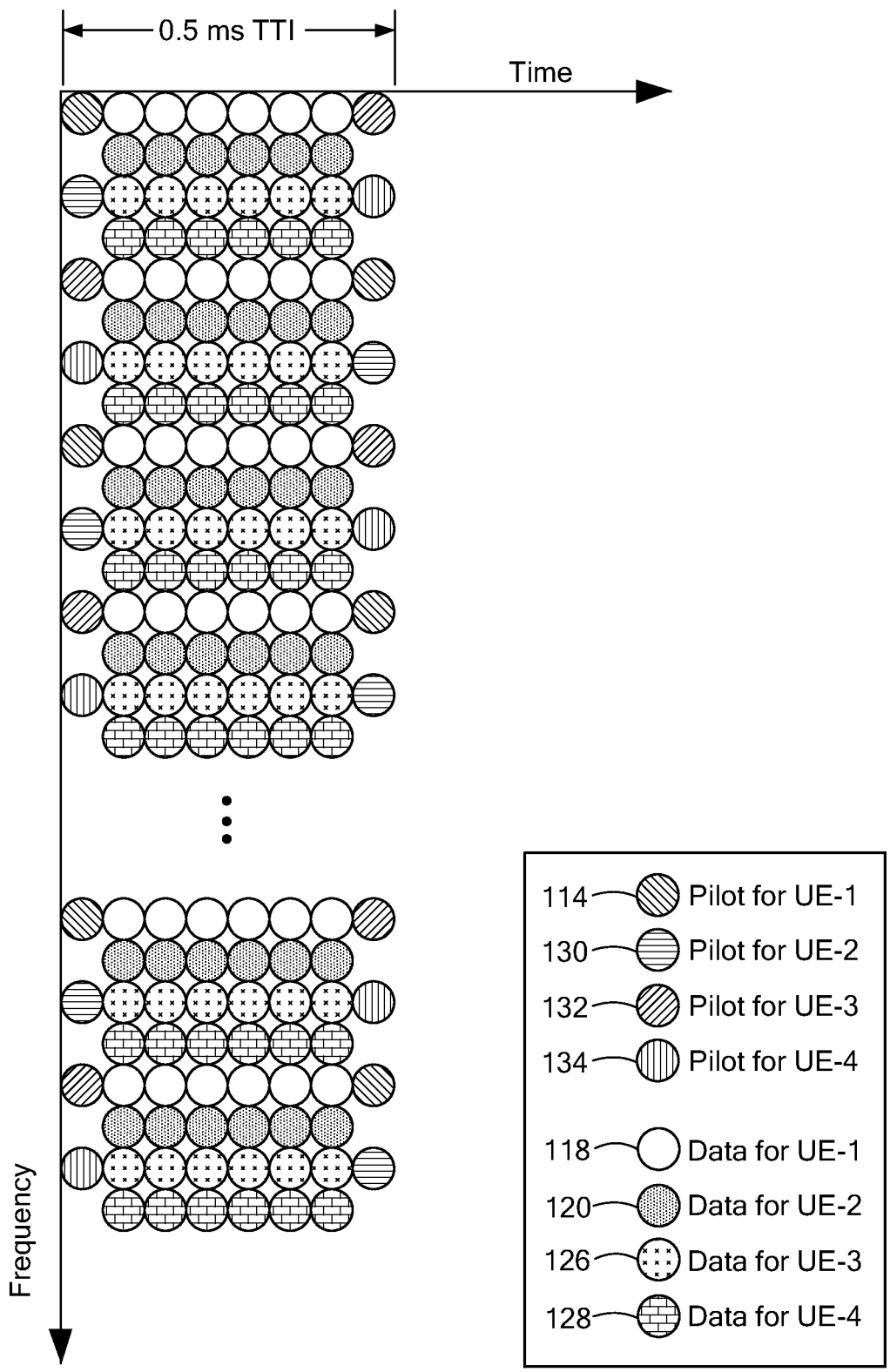
FIG. 17 is a diagram of another frequency domain arrangement for multiple user element non-MIMO sub-band IFDMA operation constructed in accordance with the present invention.

FIG. 17 is a diagram of a frequency domain arrangement for multiple UE 16 non-MIMO sub-band IFDMA operation in accordance with the present invention. Four UEs 16 are shown. As such, FIG. 17 shows data sub-carriers 126 and 128 supporting a third UE 16 and a fourth UE 16, respectively. Pilot sub-carriers 130, 132 and 134 support a second UE 16, third UE 16 and fourth UE 16, respectively. As with the 2 UE example of FIG. 15, it is not required that pilot sub-carriers use the same frequency space as the data sub-carriers for corresponding UEs 16. Different FFT sizes for pilot and data sub-carriers also provide different spacing for the pilot sub-carriers, thereby creating an environment in which data sub-carriers are more densely arranged such that not all frequency bands that support data sub-carriers will even have a pilot sub-carrier.

Figure 18:
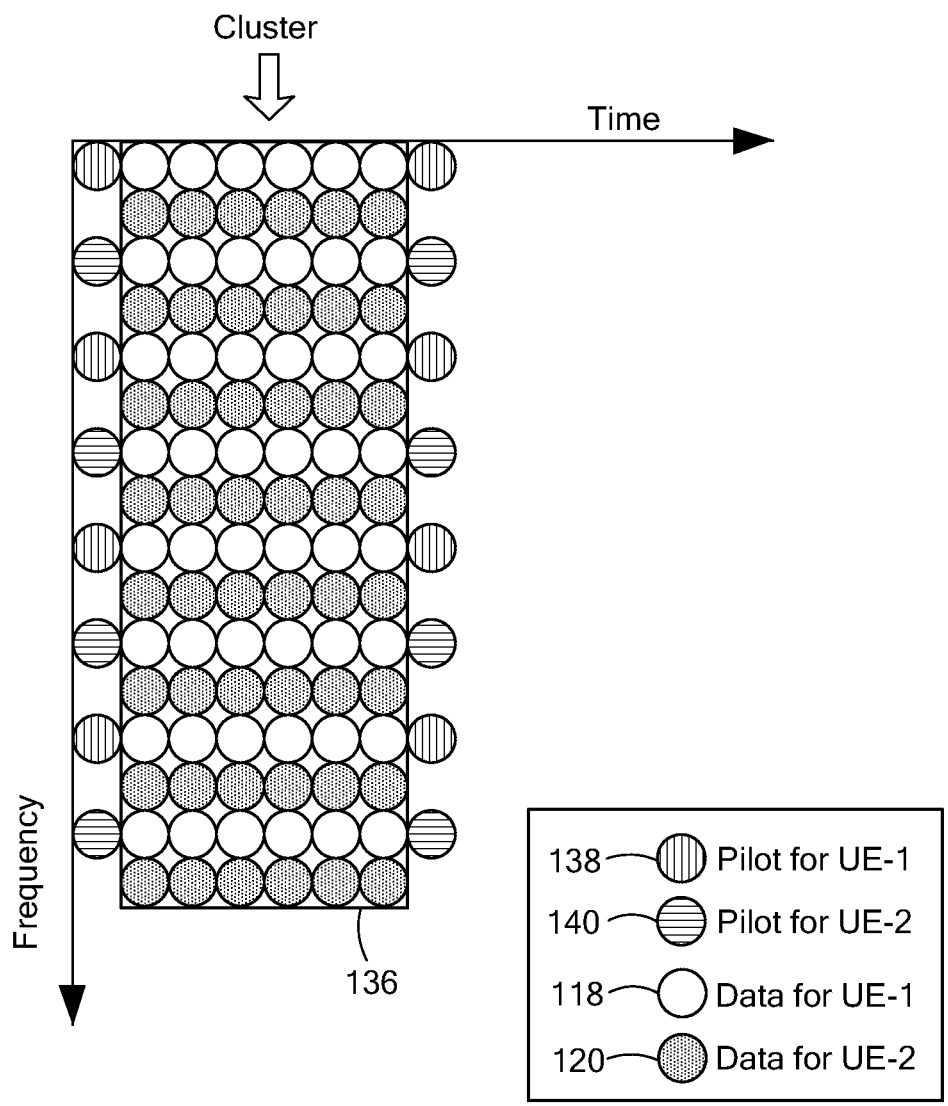
FIG. 18 is a diagram of an exemplary frequency domain arrangement and an UL cluster definition for sub-band IFDMA constructed in accordance with the present invention.

FIG. 18 is a diagram of an exemplary frequency domain arrangement and an UL cluster definition for sub-band IFDMA constructed in accordance with the present invention. In the example shown, a cluster includes 6 traffic OFDM symbols and may include 4N (N=4 for example) consecutive sub-carriers in each OFDM symbol. Pilot sub-carriers 132 and 134 support a first UE 16 and second UE 16, respectively. Of note, although FIG. 18 (and FIG. 12) does not include pilot symbols as part of the cluster, it is contemplated that the pilot symbols can be so included.

Figure 19:
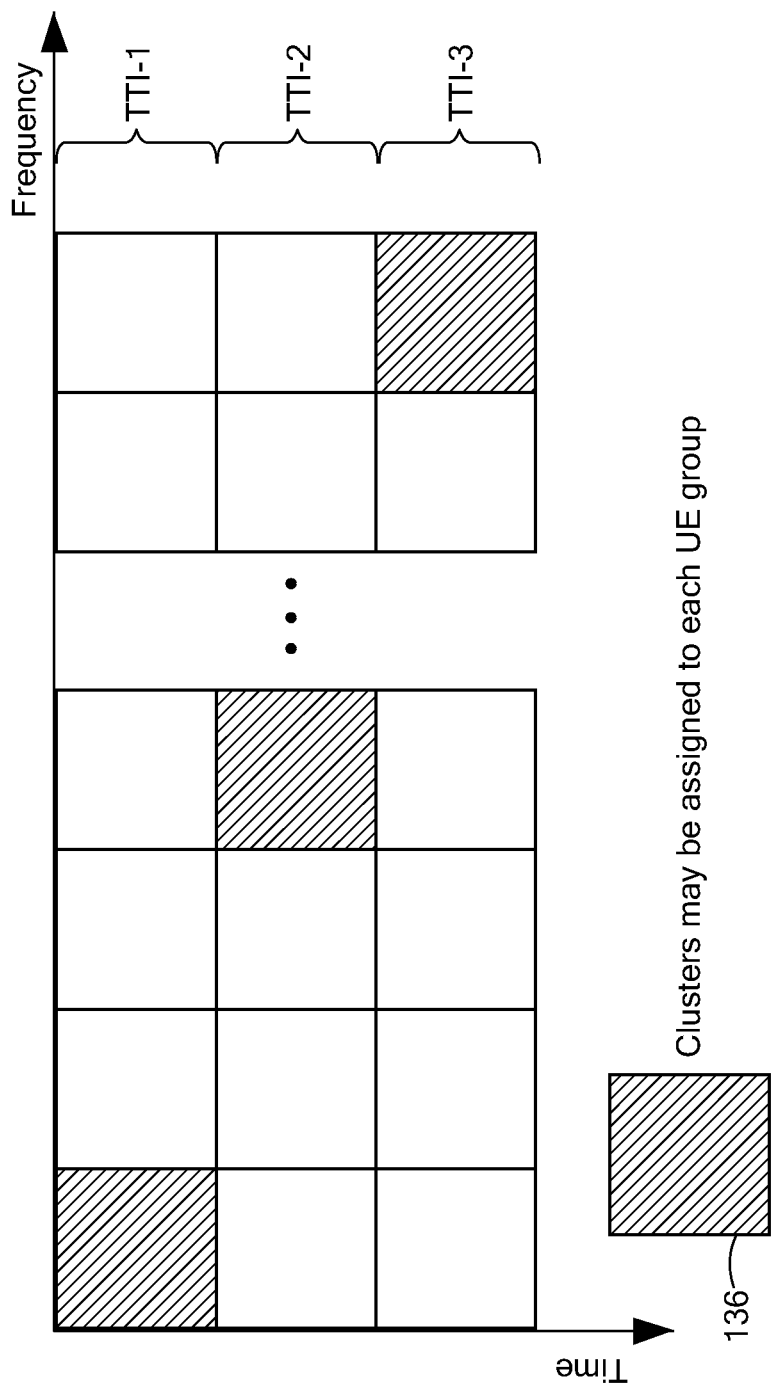
FIG. 19 is a diagram of UL cluster hopping for sub-band FDMA constructed in accordance with the principles of the present invention.

FIG. 19 is a diagram of UL cluster hopping for sub-band FDMA constructed in accordance with the principles of the present invention. Frequency diversity may be obtained by cluster hopping and one cluster hop can be included in each TTI. Cluster 130, supporting a group of UEs 16 is shown as hopping from frequency sub-band to frequency sub-band within different TTIs.

The present invention advantageously provides a system and method for FDMA communications where the FMDA communications may include localized FDMA and/or IFDMA for use in the uplink. The present invention thereby provides FDMA communications having lower PAPR and reduced overhead when compared to OFDMA. Also, the system and method of the present invention advantageously supports high speed UEs.

The system and method for FDMA uplink communication provided by the present invention can use a cyclic prefix is used to improve equalizer performance. According to embodiments of the invention described above, the cyclic prefix may be used to improve the performance of a frequency domain equalizer and reduce overhead.

FDMA communications in the present invention can use a plurality of pilot blocks, at least one having a duration that is less than the length of its respective payload block, within a time interval. Similarly, FDMA uplink communication for the present invention can use a plurality of pilot blocks, each having a duration that is less than the length of its respective payload block, within a time interval. This arrangement can result in a decreased pilot spacing in time.

The present invention also advantageously supports MIMO operation, and supports cluster hopping for gaining frequency diversity.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. A network element for use in a wireless communication network, the network element comprising:
   at least one antenna; and
   at least one signal processor coupled to the at least one antenna and configured to:
      apply a first fourier transform having a first number of points to pilot symbols corresponding to at least one pilot block to produce a transformed pilot block;
      apply a second fast fourier transform having a second number points to data symbols arranged in a cluster and corresponding to data payload block to produce a transformed data payload block, the second number of points being greater than the first number of points;
      output the transformed pilot block for transmission by the at least one antenna during a first time duration; and
      output the cluster for transmission by the at least one antenna during a second time duration using a first frequency sub-band in a first transmission time interval and using a second frequency band in a second transmission time interval, the second frequency sub-band being different from the first frequency sub-band.

2. The network element of claim 1, wherein the second time duration is not less than the first time duration.

3. The network element of claim 2, wherein the second time duration is more than the first time duration.

4. The network element of claim 1, wherein the at least one signal processor is further configured to output a plurality of pilot blocks for transmission within a transmission time interval.

5. The network element of claim 4, wherein the at least one signal processor is further configured to use at least one of the plurality of pilot blocks for a channel quality indicator (CQI) measurement.

6. The network element of claim 1, wherein the network element is a base station, and the at least one signal processor is further configured to use the first time duration and the second time duration to support multiple user element devices via sub-band interleaved frequency division multiple access (FDMA) operation.

7. The network element of claim 6, wherein a pilot for a corresponding user element device uses different sub-carrier frequencies than corresponding data sub-carriers for the user element device.

8. The network element of claim 1, wherein the at least one antenna comprises multiple antennas and the at least one signal processor is further configured to use the pilot symbols to support multiple input multiple output (MIMO) operation.

9. The network element of claim 8, wherein the at least one signal processor is further configured to use the pilot symbols to support MIMO operation by using an orthogonal pilot arrangement between different transmit antennas.

10. The network element of claim 1, wherein the network element is one of a user element device and a base station.

11. A method of operating a network element of a wireless communication network, the network element comprising at least one antenna and at least one signal processor operatively coupled to the at least one antenna, the method comprising operating the at least one signal processor to:
apply a first fast fourier transform having a first number of points to pilot symbols corresponding to at least one pilot block to produce a transformed pilot block;
apply a second fast fourier transform having a second number points to data symbols arranged in a cluster and corresponding to a data payload block to produce a transformed data payload block, the second number of points being greater than the first number of points;
output the transformed pilot block for transmission by the at least one antenna during a first time duration; and
output the cluster for transmission by the at least one antenna during a second time duration using a first frequency sub-band in a first transmission time interval and using a second frequency band in a second transmission time interval, the second frequency sub-band being different from the first frequency sub-band.

12. The method of claim 11, wherein the second time duration is not less than the first time duration.

13. The method of claim 12, wherein the second time duration is more than the first time duration.

14. The method of claim 11, further comprising operating the at least one signal processor to output a plurality of pilot blocks for transmission within a transmission time interval.

15. The method of claim 14, further comprising operating the at least one signal processor to use at least one of the plurality of pilot blocks for transmission within a transmission time interval.

16. The method of claim 11, wherein the network element comprises a base station, the method further including operating the at least one signal processor to use the first time duration and the second time duration to support multiple user element devices via sub-band interleaved frequency division multiple access (FDMA) operation.

17. The method of claim 16, wherein a pilot for a user element device uses different sub-carrier frequencies than corresponding data sub-carriers for the user element device.

18. The method of claim 11, wherein the at least one antenna includes multiple antennas, the method further comprising operating the at least one signal processor to use the pilot symbols to support multiple input multiple output (MIMO) operation.

19. The method of claim 18, further comprising operating the at least one signal processor to user the pilot symbols to support MIMO operation by using an orthogonal pilot arrangement between different transmit antennas.

20. The method of claim 11, wherein the network element is one of a user element device and a base station.

\* \* \* \* \*